(12) United States Patent
Larson

(10) Patent No.: US 9,798,413 B2
(45) Date of Patent: Oct. 24, 2017

(54) INTERACTIVE DISPLAY

(71) Applicant: Hand Held Products, Inc., Fort Mill, SC (US)

(72) Inventor: Brent D. Larson, Cave Creek, AZ (US)

(73) Assignee: Hand Held Products, Inc., Fort Mill, SC (US)

( * ) Notice: Subject to any disclaimer, the term of this patent is extended or adjusted under 35 U.S.C. 154(b) by 63 days.

(21) Appl. No.: 14/836,994

(22) Filed: Aug. 27, 2015

(65) Prior Publication Data

US 2017/0060316 A1    Mar. 2, 2017

(51) Int. Cl.
*G06F 3/041* (2006.01)
*G06F 3/0488* (2013.01)

(52) U.S. Cl.
CPC .......... *G06F 3/0416* (2013.01); *G06F 3/0488* (2013.01)

(58) Field of Classification Search
CPC .............................. G06F 3/0416; G06F 3/0488
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |

(Continued)

FOREIGN PATENT DOCUMENTS

| | | |
|---|---|---|
| EP | 2361832 A1 | 8/2011 |
| EP | 2527959 A2 | 11/2012 |

(Continued)

OTHER PUBLICATIONS

U.S. Appl. No. 14/519,179 for Dimensioning System With Multipath Interference Mitigation filed Oct. 21, 2014 (Thuries et al.); 30 pages.

(Continued)

*Primary Examiner* — Jonathan Boyd
(74) *Attorney, Agent, or Firm* — Additon, Higgins & Pendleton, P.A.

(57) ABSTRACT

Information is presented on a touchscreen display. An available viewing surface area of the touchscreen is separated into a first zone and at least a second zone. The first zone is operable for presenting a critical portion of the information. The second zone is operable for receiving haptic user inputs. Usage of the first zone and the second zone are coordinated. The presentation of the critical information in the first separated zone, and/or a prompt related to at least one of the one or more haptic user inputs may be controlled based on the coordinated usage.

20 Claims, 7 Drawing Sheets

(56) References Cited

U.S. PATENT DOCUMENTS

| | | | |
|---|---|---|---|
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |

(56) References Cited

U.S. PATENT DOCUMENTS

| | | |
|---|---|---|
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2005/0154798 A1 | 7/2005 | Nurmi |
| 2007/0063048 A1 | 3/2007 | Havens et al. |
| 2007/0126710 A1 | 6/2007 | Chen et al. |
| 2009/0134221 A1 | 5/2009 | Zhu et al. |
| 2009/0160780 A1 | 6/2009 | Arnold et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0245384 A1* | 9/2010 | Mase .......... G06F 3/0414 345/618 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0299840 A1* | 11/2012 | Larson .......... G06F 3/041 345/173 |
| 2012/0317520 A1 | 12/2012 | Lee |
| 2013/0043312 A1 | 2/2013 | Van Horn |
| 2013/0075168 A1 | 3/2013 | Amundsen et al. |
| 2013/0152001 A1 | 6/2013 | Lovitt et al. |
| 2013/0175341 A1 | 7/2013 | Kearney et al. |
| 2013/0175343 A1 | 7/2013 | Good |
| 2013/0234929 A1 | 9/2013 | Libin |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0321286 A1 | 12/2013 | Petruzzelli et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |

(56) References Cited

U.S. PATENT DOCUMENTS

| | | |
|---|---|---|
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169135 A1 | 6/2015 | Lee |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| JP | 2010-042207 A | 2/2010 |
| JP | 2010033433 A | 2/2010 |
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 14/676,327 for Device Management Proxy for Secure Devices filed Apr. 1, 2015 (Yeakley et al.); 50 pages.

U.S. Appl. No. 14/257,364 for Docking System and Method Using Near Field Communication filed Apr. 21, 2014 (Showering); 31 pages.

U.S. Appl. No. 14/327,827 for a Mobile-Phone Adapter for Electronic Transactions, filed Jul. 10, 2014 (Hejl); 25 pages.

U.S. Appl. No. 14/334,934 for a System and Method for Indicia Verification, filed Jul. 18, 2014 (Hejl); 38 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages.

U.S. Appl. No. 14/619,093 for Methods for Training a Speech Recognition System filed Feb. 11, 2015 (Pecorari); 35 pages.

U.S. Appl. No. 29/524,186 for Scanner filed Apr. 17, 2015 (Zhou et al.); 17 pages.

U.S. Appl. No. 14/705,407 for Method and System to Protect Software-Based Network-Connected Devices From Advanced Persistent Threat filed May 6, 2015 (Hussey et al.); 42 pages.

(56) References Cited

OTHER PUBLICATIONS

U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
Extended European Search Report in counterpart European Application No. 16185224.9 dated Dec. 23, 2016, p. 1-6.
Extended European Search Report in related European Application No. 17167205.8 dated Jun. 2, 2017, pp. 1-9 [EP Publication No. 257959; JP Publication No. 2010-042207; and U.S. Publication Nos. 2007/0126710; 2010/0245384; 2013/0152001; 2009/0160780 previously cited].

\* cited by examiner

INTERACTIVE DISPLAY

TECHNOLOGY FIELD

The present invention relates to information display. More particularly, an embodiment of the present invention relates to interactive information display.

BACKGROUND

Generally speaking, electronic displays are used to present information visually in various contemporary information processing systems. Interactive "touchscreen" displays may combine graphical user interface (GUI) and/or other input functionality with the visual presentation of the information.

Some of the information processing systems with which touchscreens are used may be operable for processing critical data, for which transactional reliability and security become significant factors. For example, the success of an operation may rely on related "mission critical" data processing.

The field of avionics relates to the electronic systems of aircraft, spacecraft, and satellites. While critical data are significant in the context of many contemporary business operations, avionics presents a clear and high example of the significance of reliable and secure processing of critical information. In the context of avionics, the costs of failure in relation to information processing may be unacceptably high.

Moreover, critical data may have a high time value, low duration of fresh relevance, and related heightened levels of urgency, e.g., to pilots and other aviators. A timely user response may be appropriate upon receipt of such critical information. In use environments like the cockpits and flight decks of aircraft, displays may present the information under high levels of ambient illumination or other suboptimal situational or environmental conditions. The reception of the information however may depend, at least in part, on the ability of pilots and other users to perceive the data presented and thus, the viewability with which it is presented.

Displays used in avionics and some other applications may be designed to present critical information effectively, which comprises satisfactory high levels of visibility and viewability. As used herein, the term "visibility" may refer to objective attributes related to visibility, clarity, and legibility, and the term "viewability" may refer to somewhat more subjective factors relating to perceptual and/or psychological attraction of the visual attention of users to particular visible portions of a display.

To sustain high visibility and viewability, displays used in avionics and some other applications may comprise specified optical performance criteria. For example, avionics displays may be designed to feature high luminance (intensity) and contrast (dynamic range) capabilities, as well as reflectance characteristics, which may relate to low values of specularity and diffuseness.

Touchscreen displays however may exhibit diminished optical performance over certain viewing areas that sustain heightened levels of tactile interaction. Tactile interaction may be associated with haptic user inputs. The tactile interaction levels may be considered heightened in relation to other areas of the display, which may have significantly lower levels of tactile interaction.

The diminished optical performance in the certain touchscreen display areas may relate to contamination and wear associated with repeated physical touching of the front surface of the display, and the types of tactile contact that the areas may sustain. Relative to the less-frequently touched regions of the touchscreen display surface, the more frequently touched surface areas or those that sustain certain kinds of touches may become optically fouled or marred. Optical performance may be degraded or diminished, e.g., by contamination such as fingerprints, dirt and dust, smudges, smears, oily materials (including e.g., oils, greases, and waxes), smoke and other colloidal materials or other contaminants. The optical performance may also be diminished by wear or damage, such as scratches, thinning, or patches of comparative roughness and, e.g., the degradation of display surface reflectance characteristics associated therewith.

Some approaches to preserving the effectiveness with which critical information is presented may be more simplistic than practical or consistently reliable. For example, an approach to removing the contaminants accumulated over the viewing surface of a touchscreen display (or dealing with wear) may relate simply to cleaning (or repairing or replacing) the display as-needed and/or according to a planned maintenance schedule. Approaches to using the display in bright ambient lighting may relate simply to moving the display translationally to an area of lower ambient illumination, rotating its viewing surface away from a source of bright and/or direct lighting, or physically shading the viewing surface therefrom. However, these approaches may not be feasible or practicable in some of the settings in which the touchscreen displays are deployed and used.

For example, avionics touchscreen displays deployed and used in an aircraft cockpit or flight deck may be disposed in a stationary, rigid, or immobile position relative to a control console in which they may be mounted. The confines of the cockpit may also deter an operator's ability to shade the viewing surface of the display. Moreover, it may be impractical (perhaps even unsafe, under some conditions) to clean the display surface of (or repair/replace) a touchscreen display during its use, e.g., during some flight operations. Additionally, even if cleaning (or repair/replacement) of a touchscreen display may be feasible in some situations, critical information presented therewith may be obstructed or occluded while the cleaning takes place, or touches and touch related actions (e.g., wiping) associated with the cleaning may cause inadvertent and/or erroneous inputs to haptic surfaces.

Therefore, a need exists for presenting critical information effectively under various ambient lighting conditions on an interactive display, which is also operable for receiving user inputs. A need also exists to present the critical information effectively with high levels of ambient illumination on an interactive display that precludes or obviates changing the position thereof over a translational axis and/or a rotational axis, or shading a viewing surface thereof from bright and/or direct lighting sources. Further, a need exists to preserve or sustain the optical performance of an interactive display, and the viewability of critical information presented on the viewing surface thereof, without cleaning or wiping the viewing surface, at least during the presentation of critical information therewith.

SUMMARY

Accordingly, in one aspect, example embodiments of the present invention embrace the presentation of critical information on an interactive display, which is also operable for receiving user inputs effectively and under various ambient lighting conditions, including high levels of ambient illumination (brightness). Example embodiments present the critical information effectively with high levels of ambient illumination on an interactive display without changing the position thereof over a translational axis or a rotational axis, and without shading a viewing surface thereof from a bright lighting source. Example embodiments preserve and sustain the optical performance of interactive displays, and the viewability of critical information presented on the viewing surface thereof, and independent of cleaning and wiping or other maintenance actions performed over the viewing surface.

An example embodiment of the present invention relates to a method for presenting information on a touchscreen display device comprising process steps, which may be summarized as follows. An available viewing surface area of the touchscreen display device is separated into a first zone and at least a second area. The first area is operable for presenting a critical portion of the information. The at least second area is operable for receiving one or more haptic user inputs. A usage of the first zone and a usage of the at least second zone are coordinated. The presentation of the critical information in the first separated zone, and/or a prompt related to at least one of the one or more haptic user inputs may be controlled based on the coordinated usage.

The process may further comprise monitoring of one or more of a plurality of characteristics relating to an operating environment in which the touchscreen display device is used and adjusting an operating characteristic of the touchscreen display device. A visibility characteristic of the presented information may be modified based on the monitored one or more characteristics.

The plurality of characteristics relating to an operating environment in which the touchscreen display is used relates to a lighting condition proximate to the touchscreen display device viewing surface, a location of the touchscreen display within a host, an orientation of the touchscreen display within the host, a location of the host, an orientation of the host, a current time of day, a current date, a weather condition, and/or an input from a user of the touchscreen display in relation to at least one of the plurality of operating environment characteristics. The host may comprise a vehicle such as an aircraft, a spacecraft, or a vehicle operable over one or more transport media, including air, space, water, and/or land.

The process may further comprise monitoring at least one characteristic relating to a visibility of the information presented on the touchscreen display device. The monitored at least one characteristic may be compared to a reference target, which is stored in relation thereto. An action may be performed based on the comparison. The action performed may comprise recommending a cleaning of at least a portion of the touchscreen display device viewing surface and/or adjusting an operating characteristic of the touchscreen display device, which is operable for modifying the visibility characteristic of the presented information.

In an example embodiment, the separating of the available viewing surface area of the touchscreen display device may comprise allocating a first portion of the available viewing surface area to the first zone and allocating a second portion of the available viewing surface area to the at least second zone. The allocated second portion is spatially segregated, at least partially, from the first allocated portion. The allocated second portion may be disposed peripherally in relation to the allocated first portion.

The process may further comprise monitoring the at least second zone in relation to the receiving of the one or more haptic user inputs. A usage history of the touchscreen display device is then evaluated, based on the monitoring of the at least second zone in relation to the receiving of the one or more haptic user inputs. The allocation of one or more of the first zone or the at least second zone may be changed, adjusted, or modified based on the evaluated usage history.

In another aspect, an example embodiment of the present invention relates to a non-transitory computer readable storage medium such as memory, optical, magnetic, electronic, or other tangible physical media. In an example embodiment, the non-transitory computer readable medium comprises instructions physically stored therewith. The instructions are operable for causing, or controlling a processor device to perform a computer based method for presenting information on a touchscreen display, such as the method summarized above.

In yet another aspect, an example embodiment of the present invention relates to a system operable for presenting information. In an example embodiment, the information presentation system is operable for presenting the information on a touchscreen display. In an example embodiment, the system comprises a display component ("display"), a touchscreen component ("touchscreen"), and a controller component ("controller").

The display comprises a viewing surface. The display is operable for rendering the presented information visually over an available area of the viewing surface.

The touchscreen comprises a transparent material, which is disposed over at least a portion of the available viewing surface area of the display device. The touchscreen is operable for receiving one or more haptic user inputs.

The controller component is operable for separating the available viewing surface area of the display component into a first zone over which the information is presented, and at least a second zone conforming to at least a portion of the touchscreen component and over which at least a portion of the haptic user inputs are received. The controller is further operable for coordinating a usage of the first zone and a usage of the at least second zone.

In an example embodiment, the system comprises a subsystem operable for monitoring and using situational and environmental data to change the optical output of touchscreen display devices and adjust their information presentation performance over various lighting and other conditions.

In an example embodiment, the system comprises a subsystem operable for monitoring and evaluating data relating to the optical output performance of the touchscreen display and for changing the optical output of touchscreen display devices and adjust their information presentation performance accordingly.

In an example embodiment, the system comprises a subsystem operable for monitoring and evaluating a history of haptic inputs to the haptic input receiver and to adjust the coordination of the placement of the critical information section and/or the preferred touch zone based on the haptic input history.

The foregoing summary is presented by way of example, and not limitation, as a conceptual prelude to the following detailed description of example embodiments and each figure (FIG.) of the accompanying drawing, referred to therein.

DETAILED DESCRIPTION OF EXAMPLE EMBODIMENTS

Figure 1:
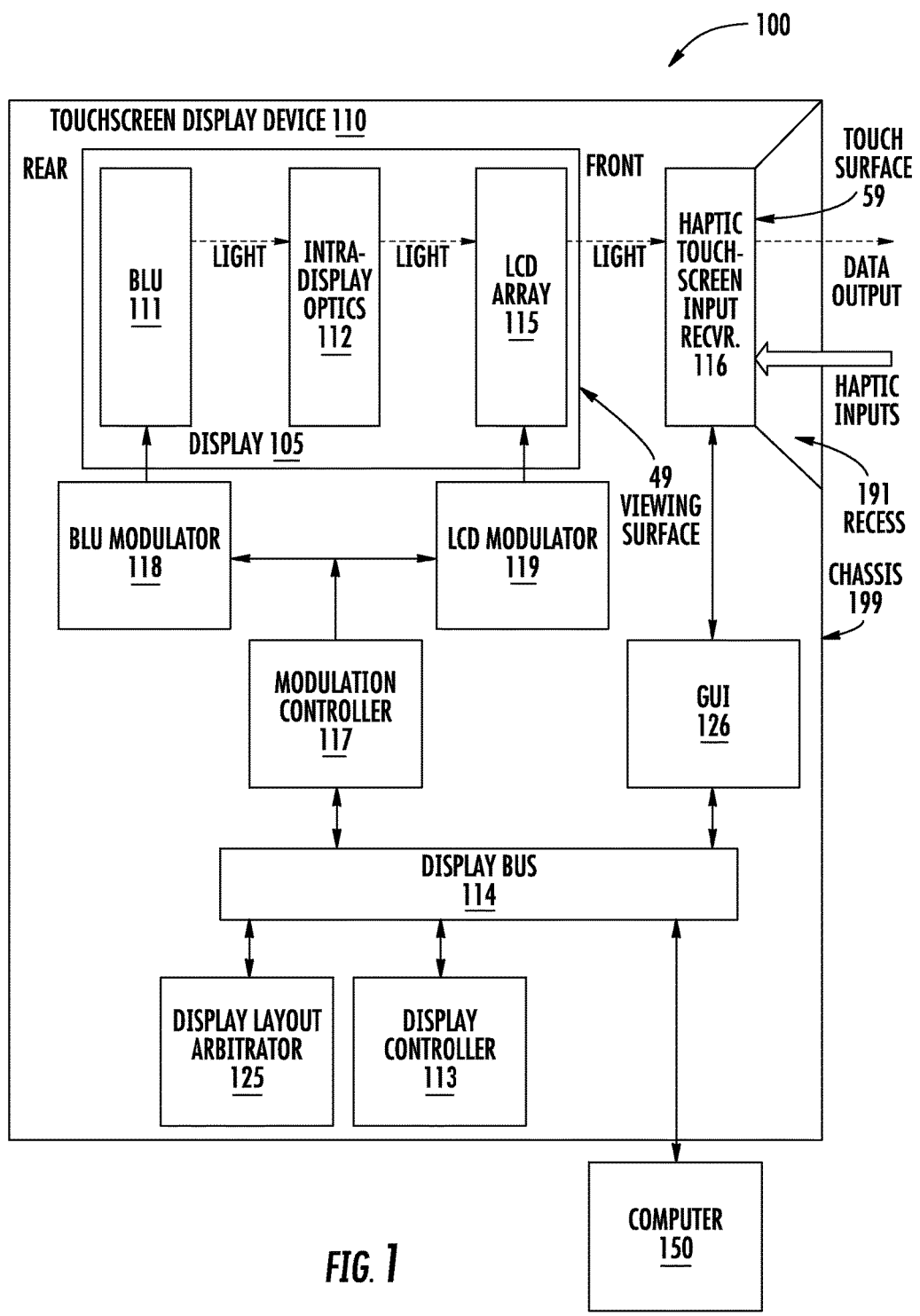
FIG. 1 depicts an example information display and input system, according to an example embodiment of the present invention.

Example embodiments of the present invention relate to a method for presenting information on a touchscreen display device. An available viewing surface area of the touchscreen display device is separated into a first zone and at least a second area. The first area is operable for presenting a critical portion of the information. The at least second area is operable for receiving one or more haptic user inputs. A usage of the first zone and a usage of the at least second zone are coordinated. The presentation of the critical information in the first separated zone, and/or a prompt related to at least one of the one or more haptic user inputs may be controlled based on the coordinated usage.

Example embodiments of the present invention thus present critical information on an interactive display, which is also operable for receiving user inputs effectively and under various ambient lighting conditions, including high levels of ambient illumination. Example embodiments present the critical information effectively with high levels of ambient illumination on an interactive display without changing the position thereof over a translational axis or a rotational axis, and without shading a viewing surface thereof from a bright lighting source. Example embodiments preserve and sustain the optical performance of interactive displays, and the viewability of critical information presented on the viewing surface thereof, and independent of cleaning and wiping or other maintenance actions performed over the viewing surface.

Overview.

An example embodiment of the present invention is described in relation to a method for presenting information on a touchscreen display device comprising process steps, which may be summarized as follows. An available viewing surface area of the touchscreen display device is separated into a first zone and at least a second area. The first area is operable for presenting a critical portion of the information. The at least second area is operable for receiving one or more haptic user inputs. A usage of the first zone and a usage of the at least second zone are coordinated. The presentation of the critical information in the first separated zone, and/or a prompt related to at least one of the one or more haptic user inputs may be controlled based on the coordinated usage.

The process may further comprise monitoring of one or more of a plurality of characteristics relating to an operating environment in which the touchscreen display device is used and adjusting an operating characteristic of the touchscreen display device. A visibility characteristic of the presented information may be modified based on the monitored one or more characteristics.

The plurality of (multiple) characteristics relating to an operating environment in which the touchscreen display is used relates to a location of the touchscreen display within a host, an orientation of the touchscreen display within the host, a location of the host, an orientation of the host, a current time of day, a current date, a weather condition, and/or an input from a user of the touchscreen display in relation to at least one of the plurality of operating environment characteristics.

The process may further comprise monitoring at least one characteristic relating to a visibility of the information presented on the touchscreen display device. The monitored at least one characteristic may be compared to a reference target, which is stored in relation thereto. An action may be performed based on the comparison. The action performed may comprise recommending a cleaning of at least a portion of the touchscreen display device viewing surface and/or adjusting an operating characteristic of the touchscreen display device, which is operable for modifying the visibility characteristic of the presented information.

In an example embodiment, the separating of the available viewing surface area of the touchscreen display device may comprise allocating a first portion of the available viewing surface area to the first zone and allocating a second portion of the available viewing surface area to the at least second zone. The allocated second portion is spatially segregated, at least partially, from the first allocated portion. The allocated second portion may be disposed peripherally in relation to the allocated first portion.

The process may further comprise monitoring the at least second zone in relation to the receiving of the one or more haptic user inputs. A usage history of the touchscreen display device is then evaluated, based on the monitoring of the at least second zone in relation to the receiving of the one or more haptic user inputs. The allocation of one or more of the first zone or the at least second zone may be changed, adjusted, or modified based on the evaluated usage history.

Example embodiments described herein also relate to non-transitory computer readable storage media and to systems operable in relation to the process.

Example System.

FIG. 1 depicts an example information display and input system 100, according to an example embodiment of the present invention. The information presentation system 100 is operable for presenting the information on a touchscreen display device 110. In an example embodiment, the system 100 comprises a display 105, a haptic input receiver 116, and one or more controller components.

The touchscreen display device 110 may comprise a liquid crystal display (LCD) 105, which is operable for rendering images by modulating variable polarization states of an array of active liquid crystal transistor components. For purposes of illustration, the display 105 is described in relation to an example AMLCD active matrix liquid crystal display (AMLCD). The description of the display 105 as in relation to an example AMLCD is by way of illustration and is not intended to be limiting in any way. On the contrary, embodiments of the present invention are well suited to implementation in relation to various display technologies. Thus for example, the display 105 may relate to an AMLCD as described, an emissive display such as an active matrix organic liquid crystal display (AMOLED), a rear-projection display, or a display comprising one or more other opto-electronically active devices. The touchscreen display device 110 also comprises an interface input surface 116 operable for receiving haptic inputs from a user.

The display 105 comprises a viewing surface 49. The display 105 is operable for rendering the presented information visually over an available area of the viewing surface 49.

The touchscreen 116 comprises a transparent material, which is disposed over at least a portion of the available viewing surface area 49 of the display device 105. An outer touch surface 59 of the haptic input receiver 116 comprises a planar area that conforms, at least partially and over a spatial plane corresponding to the viewing surface 49 of the display 105. The touchscreen 116 is operable for receiving one or more haptic user inputs.

Figure 2:
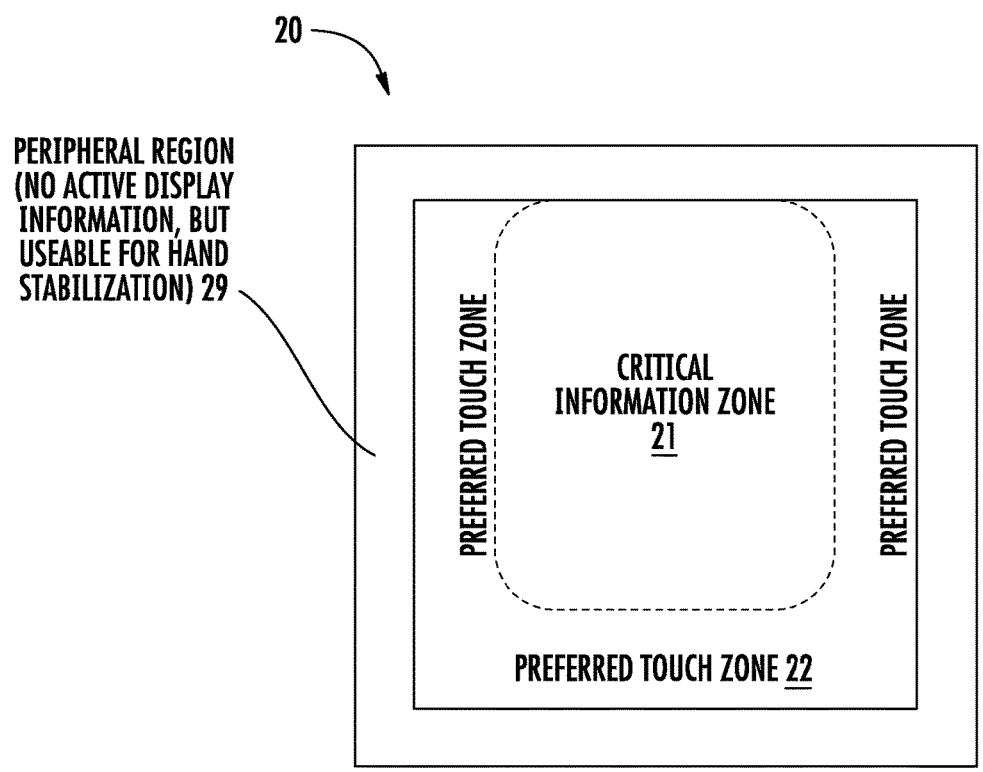
FIG. 2 depicts a screenshot of an example touchscreen display layout, according to an example embodiment of the present invention.

FIG. 2 depicts a screenshot of an example touchscreen display layout 20, according to an example embodiment of the present invention. With reference to FIG. 1 and FIG. 2, the controller components comprise a display layout arbitrator 125, which is operable for separating the available viewing surface area 49 of the display 105 into a first zone 21 over which the information is presented, and at least a second zone 22. The at least second zone 22 conforms, at least partially, to the touchscreen component 116. At least a portion of the haptic user inputs are received in relation to haptic actions performed over the at least second zone 22. The arbitrator 125 controller is further operable for coordinating a usage of the first zone 21 and a usage of the at least second zone 22.

The touchscreen display device 110 comprises a display 105, which is operable for rendering the presented information and other images over the viewing surface 49. The display 105 comprises a backlight unit (BLU) 111, which is disposed in a rear portion of the display and operable for emitting light. The light emitted by the BLU 111 may be filtered, focused, reflected, and/or otherwise modified with an internal array of substantially passive optical components (optics) 112, such as mirrors, prisms, diffraction gratings, lenses, filters, and windows. The light may be emitted by the BLU 111 in a particular polarization state, or the particular polarization state may be imparted to the light by the internal optics 112.

The display 105 comprises an array of LCDs 115 or other opto-electronically active devices. A polarization state corresponding to the active LCD devices corresponding to each picture element (pixel) of an image rendered over the viewing surface 49 may be switched controllably to either conform, or to not conform, to the polarization state of the light emitted by the BLU 111. While the BLU 111 is disposed in a rear portion of the display 105, the active LCD devices (e.g., active elements, pixels, etc.) of the LCD array 111 are disposed in a front facing portion and thus, towards an operator thereof.

The LCD devices with a non-conforming polarization state relative to that of the light emitted by the BLU 111 absorb a substantial portion thereof, and thus block its passage optically. On the other hand, the LCD devices with polarization states that conform to that of the light emitted by the BLU 111 are transmissive in relation thereto, and thus allow a significant portion thereof to pass through without absorption. Portions of the viewing surface 49 of the display 105 that are proximate to LCD devices of the array 115 in their non-conforming polarization state appear dark. On the other hand, portions of the viewing surface 49 that are proximate to LCD devices of the array 115 in their transmissive polarization state appear bright.

The polarization states of each of the active elements of the LCD array 115 are switched controllably by a LCD modulator 119. The bright and dark portions of the viewing area are visible through the transparent touchscreen surface disposed at least partially over the viewing surface 49. Thus, the display 105 renders images with which the information may be presented.

Example embodiments of the present invention relate to maximizing viewability and other visibility related attributes with which critical information is displayed on the display device 110 with the touchscreen input device 116. In some applications such as avionics, the critical information is displayed to be readily visible over various ambient conditions. The ambient conditions include a presence of high ambient illumination levels, such as in the cockpit or flight decks of aircraft or spacecraft. The display device 105 may thus perform with optical performance specifications such as, for example, low values of specular reflectance and diffuse reflectance, as well as high values of luminance (brightness, intensity), contrast, and contrast ratio (dynamic range).

The display 105 may thus implement a high contrast ratio with optical performance over a heightened (e.g., high) dynamic range (HDR). An example embodiment may thus be implemented in which the BLU 111 comprises an array of light emitting diodes (LEDs) or other active opto-electronic devices that may emit light at heightened intensity (e.g., relative to typical fluorescent light sources, which may also be used in some BLUs).

The polarization states of the individual elements of the LCD array are controlled by a modulation signal from the LCD modulator 119, and the emissive states (e.g., on or off) of individual LED elements of the BLU 111 are controlled based on modulating signals from a BLU modulator 118. To render of the images with which the information is presented, an example embodiment may be implemented in which the BLU 111 modulation signals from the BLU modulator 118 and the LCD modulation signals from the LCD modulator 119 are coordinated (e.g., synchronized, harmonized, etc.) in real time by a modulation controller 117.

Some HDR displays may comprise one or more other active elements, which may be modulated with signals controlled by the modulation controller 117. Thus, an example embodiment may be implemented with an N-modulation scheme, in which N comprises a positive whole number integer greater than or equal to two (2).

With the display 105, the haptic touchscreen input receiver 116 provides combined operability to present the information rendered on the viewing surface 49 visually, as well as to receive haptic inputs. Upon receiving the haptic inputs, the touchscreen receiver 116 provides corresponding signals to a graphical user interface (GUI) 126.

An example embodiment may be implemented in which the haptic input surface 116 comprises two arrays of microscopic or transparent conductors, each of which is insulated electrically from the other and disposed within a dielectric matrix in a substantially perpendicular (or other) orientation relative to the other. The haptic inputs comprise pressure applied to an outer surface of the input receiver (and/or simply the proximity of a user's finger, etc.), gestures associated with the pressure (and/or proximity) such as a 'swipe' or other gesture, which cause corresponding local changes in electrical capacitance values proximate to the pressure application that are sensed by the conductor grids to effectuate signals corresponding to the haptic inputs.

The capacitance values may comprise self-capacitance, surface capacitance, or may relate to surface, mutual, and/or projected capacitances. Alternatively or additionally, example embodiments may be implemented in which the inputs are received by resistive, ultrasonic (e.g., surface acoustic wave sensors), infrared (and/or other optical sensors), piezoelectric (e.g., dispersive signal sensors) or other haptic sensing means.

An example embodiment segments or other portions of the available display viewing area 49, and the corresponding areas of the touchscreen input receiver 116, into multiple zones. The display area 49 comprises two or more zones, including the critical information zone 21, a preferred touch zone 22. The display viewing area 49 may also comprise a peripheral zone 29, and one or more additional zones. Information may be presented, displayed, or rendered in any of the zones and/or over the entire available viewing area 49. The usage of the critical information zone 21, the preferred touch zone 22 and the other zones is coordinated, synchronized, harmonized or otherwise controlled ("coordinated") by the display layout arbitrator 125 and/or one or more other computational subsystems, such as a display controller 113.

Additionally or alternatively, the usage of the critical information zone 21, the preferred touch zone 22, and the other zones may be coordinated by a computer 150, which may be external in relation to the touchscreen display device 110.

The touchscreen display device 110 may comprise a display data bus 114. The display data bus 114 is operable for exchanging signals between the display layout arbitrator 125, display controller 113, GUI 126, modulation controller 117, other components of the touchscreen device 110 and/or the computer 150. The components of the touchscreen display device 110 may be disposed in a chassis 199. The outer surface of the haptic touchscreen input receiver 116 may be accessible within a recess 191, which is set within the chassis 199.

The display controller 113 may control various aspects of the operation of the display 105. The display layout arbitrator 125 is operable for controlling the display output in relation to the prompting for user inputs from the haptic input receiver 116.

The haptic input receiver 116 may cover the entire display, or any part thereof. Control and selection inputs, such as sliders, scroll bars, buttons, keypads, menus, and other control functions are displayed and prompted for in the pre-designated ("preferred") touch zone 22.

The critical information zone 21 is operable for displaying symbology or other information which does not normally require or prompt for touch input at that particular location. When appropriate, critical information is presented primarily in the critical information zone 21, which remains largely untouched. In example embodiments, the visibility of the critical information thus remains largely unimpeded or undistorted from smudges, fingerprints and other marring typically related to haptic touching events. Moreover, displayed information rendered over individually discernable gray levels may also be displayed outside of the preferred touch zone 22.

Haptic inputs may still be accepted (and occasionally prompted for) within the critical information zone 21. However, example embodiments favor output from the critical information zone 21 and thus minimize the degree of input (and concomitant optical fouling) therein. Not dissimilarly, critical information may also be presented outside the critical information zone 21. In such cases, a corresponding alert message, icon, or symbol may be presented within the critical information zone 21. Each of these two indications may direct the attention of an operator to the other display location having related, corresponding content.

The critical information zone 21 may reside in one contiguous section of the active display viewing area 49. Alternatively, the critical information zone 21 may reside in two or more subzones or sections of the viewing area 49. Visual delineation of any abrupt or non-abrupt zone boundaries may be an optional feature. The minimal use of symbology or other information, which elicit touches or other haptic inputs, minimizes surface contamination in the critical information area 21.

Thus, visibility of critical flight information remains unimpeded by marring of the haptic touch surface. Moreover, increasing luminance or frequent cleaning of the screens (and/or user hands) is minimized or obviated.

An example embodiment may be implemented in which the preferred touch zone 22 is positioned primarily in perimeter regions corresponding to the available viewing surface 49 of the display 105, e.g., the right, left and bottom regions. Thus, peripheral regions 29 of the display may provide stabilizing regions for bracing and/or resting an operator's hand, which in aeronautical or similarly rigorous settings may be helpful in the presence of turbulence and for extended area display operations, which could otherwise cause fatigue more quickly.

Example Process.

Figure 3:
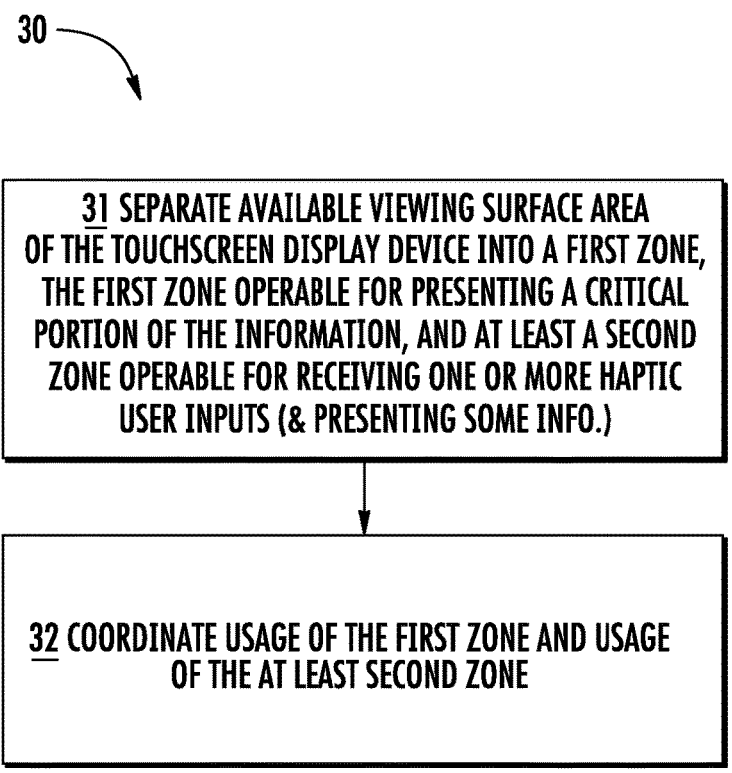
FIG. 3 depicts a flowchart for an example process for presenting information, according to an example embodiment of the present invention.

FIG. 3 depicts a flowchart for an example process 30 for presenting information, according to an example embodiment of the present invention.

In step 31, an available viewing surface area of the touchscreen display device is separated into a first zone, the first zone operable for presenting a critical portion of the information, and at least a second zone operable for receiving one or more haptic user inputs (as well as for presenting some information).

In step 32, a usage of the first zone and a usage of the at least second zone are coordinated.

The presentation of the critical information in the first separated zone (critical information zone 21), and/or a prompt related to directing at least one of the one or more haptic user inputs to the second separated zone (preferred touch zone 22) may be controlled based on the coordinated usage.

Figure 7:
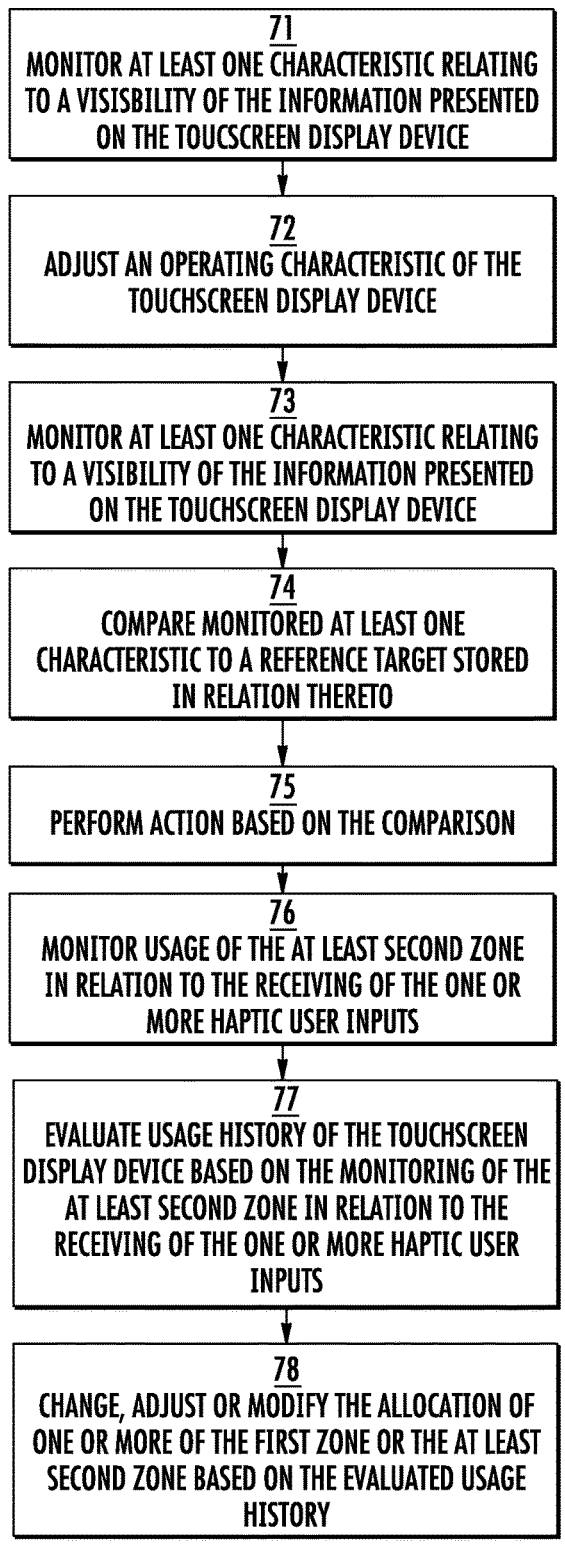
FIG. 7 depicts a flowchart for an example process for presenting information, according to an example embodiment of the present invention.

Example embodiments may also relate to the performance of other process steps (e.g., one or more of steps 71-78, inclusive, of example Process 70; described below with reference to FIG. 7), which may thus be considered optional (e.g., relative to the step 31 and the step 32 of the process 30).

In another aspect, an example embodiment of the present invention relates to a non-transitory computer readable storage medium such as memory, optical, magnetic, electronic, or other tangible physical media. In an example embodiment, the non-transitory computer readable medium comprises instructions physically stored therewith. The instructions are operable for causing, or controlling a processor device to perform a computer based method for presenting information on a touchscreen display, such as the example method 30 described above.

Example Subsystems.

The information display and input system 100 may also comprise subsystems relating to monitoring optical performance and/or evaluation of haptic inputs. In contrast to touchscreen display devices that may comprise components of, or be used with such as smartphones, tablet computers and other more typical mobile computing devices, touchscreen displays used in avionics on flight decks, cockpits and various instrument panels cannot simply be rotated or shifted to maximize visibility. Nor may their visibility be improved consistently or conveniently by simply shading their viewing surfaces from bright light sources. If lighting conditions are such that there is direct sun shafting or other problematic lighting conditions on aircraft touchscreen display surfaces, pilots and other operators may be constrained in efforts to readily eliminate or change that adverse lighting condition at will.

In an example embodiment, the system 100 comprises a subsystem operable for monitoring and using situational and environmental data to change the optical output of touchscreen display devices and adjust their information presentation performance over various lighting and other conditions. An example embodiment may also (or alternatively) relate to using situational and environmental data to change the optical output of touchscreen display devices and adjust their information presentation performance over various lighting and other conditions.

Figure 4:
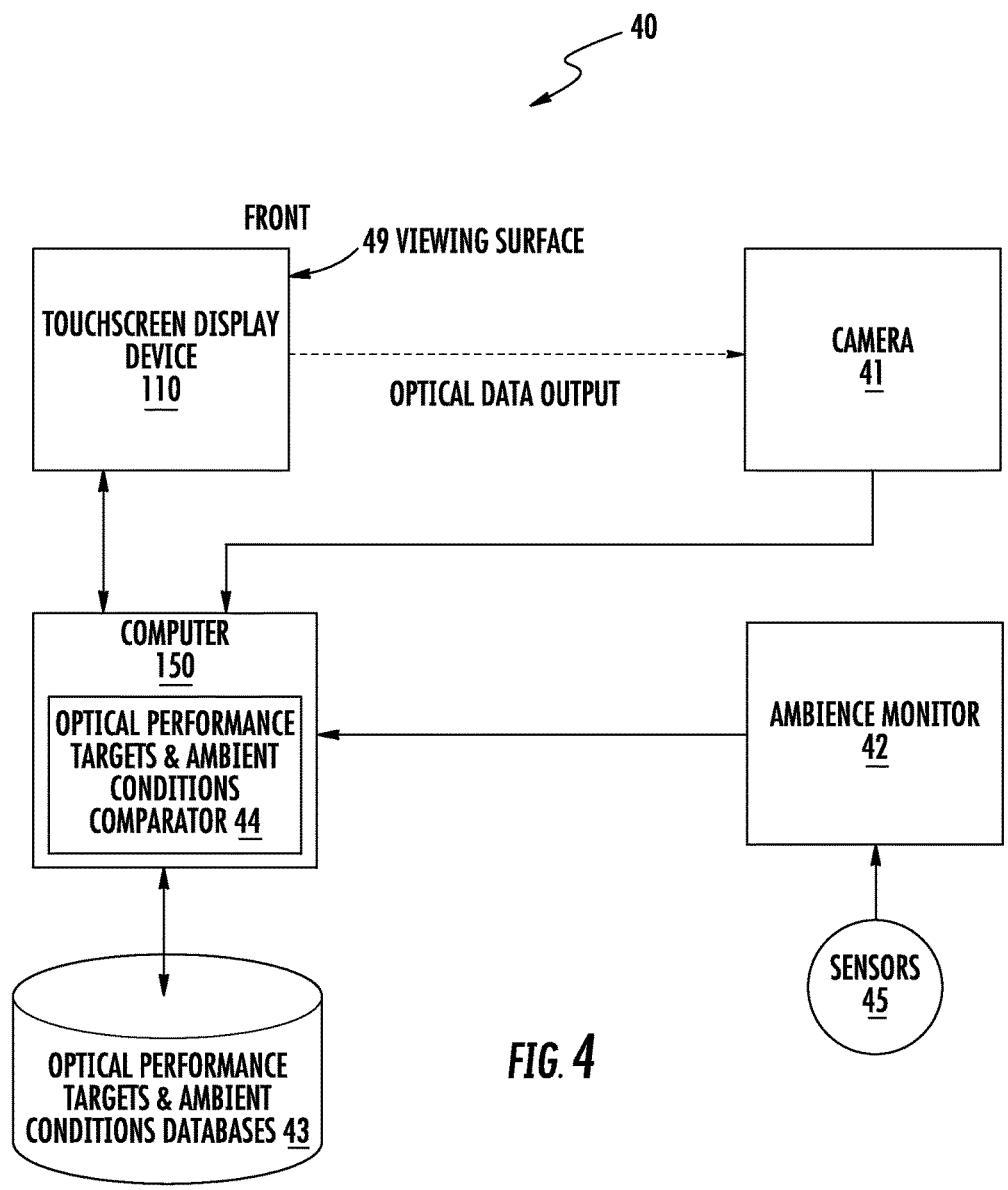
FIG. 4 depicts an example optical performance and ambience monitoring subsystem, according to an example embodiment of the present invention.

FIG. 4 depicts an example optical performance and ambience monitoring subsystem 40, according to an example embodiment of the present invention. The subsystem 40 comprises an array of one or more sensors 45, which is operable for gathering data relating to a plurality of situational and environmental data. The sensor array 45 generates signals corresponding to the gathered situational/environmental data, which are monitored by an ambience monitor 42.

The plurality of characteristics relating to an operating environment in which the touchscreen display is used relates to a lighting condition proximate to the touchscreen display device 110 viewing surface 49, a location of the touchscreen display within a host (e.g., an aircraft, spacecraft or other vehicle operable over air, space, land and/or water related transport media), an orientation of the touchscreen display within the host, a location of the host, an orientation of the host, a current time of day, a current date, a weather condition, and/or an input from a user of the touchscreen display in relation to at least one of the plurality of operating environment characteristics. The sensor array 45 may thus comprise sensor devices such as photocells or other photodetectors, and/or inputs relating to navigational (e.g., geopositioning, compass), timekeeping, chronometric and calendar, meteorological and other data.

In an example embodiment, the subsystem 40 is also (or alternatively) operable for monitoring and evaluating data relating to the optical output performance of the touchscreen display and for changing the optical output of touchscreen display devices and adjust their information presentation performance accordingly. A camera 41 (or similarly capable optical monitor) monitors the optical data output and performance over the viewing surface 49 of the touchscreen display device 110. The camera 41 generates signals corresponding to the gathered optical output and performance data.

The camera 41 and/or the ambience monitor 42 provide the signals generated respectively in relation to the optical data output and the situational/environmental data to the computer 150. The computer 150 comprises a comparator 44, which is operable with one or more databases 43.

The comparator 44 is operable for comparing the data provided in the signals received from the camera 41 to corresponding optical performance targets, stored in the database 43. The comparator 44 is also (or alternatively) operable for comparing the data provided in the signals received from the ambience monitor 42 to corresponding ambient conditions performance adjustment settings, stored in the database 43. The computer 150 is operable for adjusting the optical output and/or performance of the touchscreen display device 110 based on the comparisons. The comparator 44 may also (or alternatively) comprise a component of the touchscreen display device 110.

An example embodiment thus leverages situational/environmental data to adjust the visibility of the presented information and other images rendered by the touchscreen display device 110. Based on the situational/environmental data, anticipated ambient lighting conditions are computed. Placement of the critical information and positioning of the critical information zone 21 over the viewing surface 49 may be adjusted and modified maximum visibility, impact and other viewability factors. The computer 150 may be operable to adjust settings of the display device 110, such as luminance, contrast, gamma, and/or other optical parameters and characteristics, which may be relate to maximizing visibility of the presented information and other images rendered by the display.

An example embodiment thus uses a direct assessment of visibility characteristics of the optical output of the touchscreen display device 110. The camera 41 (or similar sensor) monitors a view of the contrast and related optical performance and visibility factors of the presented information and other imagery rendered over the viewing surface 49. In an avionics milieu, the information is presented on display in the cockpit and/or on the flight deck on instrument panel touchscreen display devices.

The comparator 44 allows a processor of the computer 150 to compare the intended displayed image content, stored as target data with the database 43 with the observed optical output data from image content presented over the viewing surface 49 and provide various levels of responsive adjustment. At a first level for example, a recommendation for cleaning might be provided, if the flight (or other) situation would readily and/or safely allow such action. At a second level, the displayed imagery may be adjusted for maximum visibility based on the direct observation.

Figure 5:
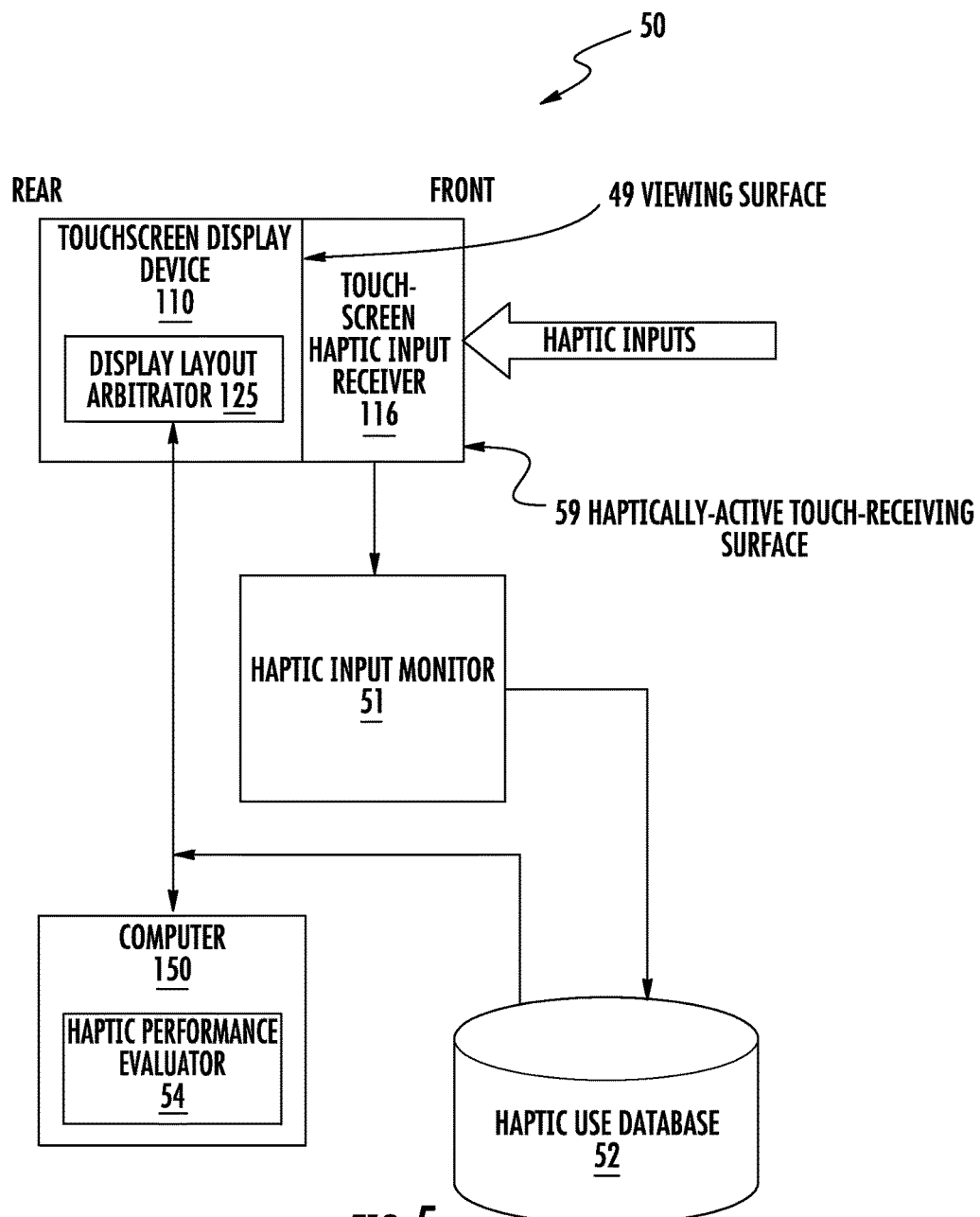
FIG. 5 depicts an example haptic input evaluation subsystem, according to an example embodiment of the present invention.

In an example embodiment, the system comprises a subsystem operable for monitoring and evaluating a history of haptic inputs to the input receiver 116 and to adjust the coordination of the placement of the critical information section 21 and/or the preferred touch zone 22 based on the haptic input history. FIG. 5 depicts an example haptic input evaluation subsystem 50, according to an example embodiment of the present invention.

Normal or nominal imagery or symbology may thus be presented by the touchscreen display 110 without particular regard to the impact of haptic inputs and other touch related events on the touchscreen input receiver 116 overlaying the viewing surface of the display 105.

A haptic input monitor is operable for monitoring the haptic inputs (and other touch related events) received by the touchscreen haptic input receiver 116 and updating a haptic usage history accordingly. The haptic usage history is stored in a haptic usage database 62. This usage history at least comprises a number of haptic inputs (touches) and/or a number of prompts for haptic inputs over different regions of the haptically-active touch-receptive surface 59, which are disposed over corresponding portions of the display device viewing surface area.

The computer 150 may comprise a haptic performance evaluator 54, which is operable for querying the haptic use history database 52 and evaluating the haptic history stored therein. Based on the evaluation of the stored haptic use history, the computer 150 signals the display layout arbitrator 125, which may rearrange the positioning of the critical information and prompts for haptic inputs based on the signals. Additionally or alternatively, the haptic performance evaluator 54 may be disposed, deployed, or associated, at least partially, with the display layout arbitrator 125 (and/or the display controller 113) in the touchscreen display device 110.

Figure 6:
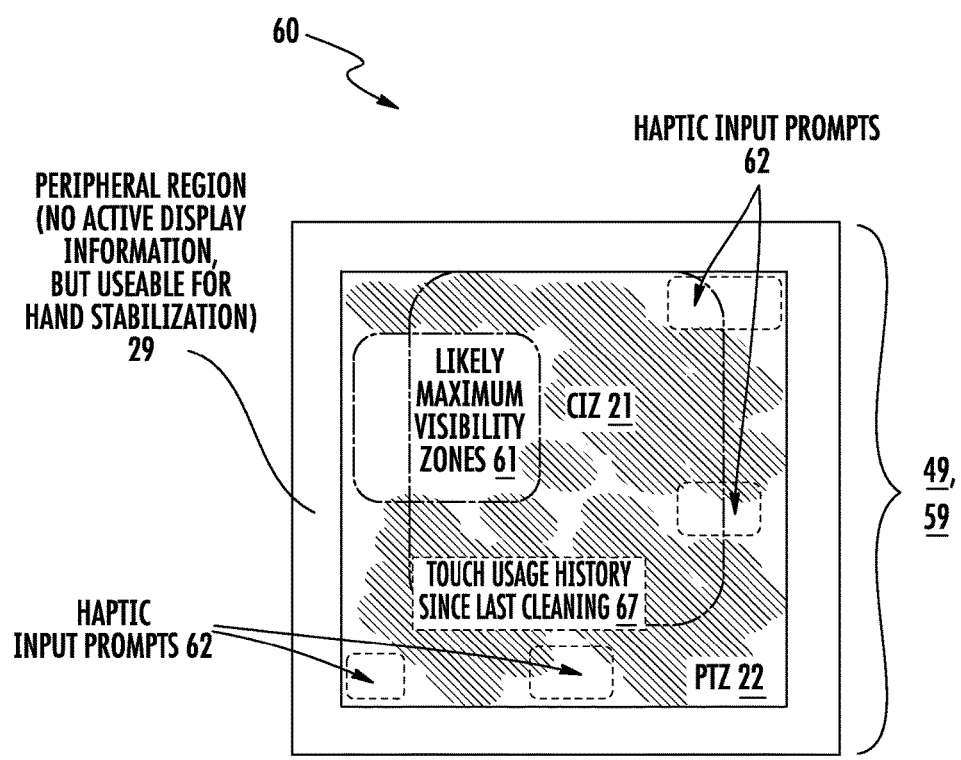
FIG. 6 depicts a screenshot of an example touchscreen display layout, according to an example embodiment of the present invention.

FIG. 6 depicts a screenshot of an example touchscreen display layout 60, according to an example embodiment of the present invention. Based on signaling relating to the evaluation of the stored haptic history, the display layout arbitrator 125 may adjust the layout of the viewing surface in relation to the presentation of information, prompts for haptic inputs, and rendering of other visual information. As described above with reference to FIG. 1 and FIG. 2, the display layout arbitrator 125 is operable for separating the available viewing surface area 49 of the display 105 into a first zone, which is operable as a critical information zone (CIZ) 21 over which the information is presented, and at least a second zone 22. The at least second zone 22 conforms, at least partially, to the touchscreen component 116, and is operable as a preferred or pre-configured haptic input zone (PIZ) 22. At least a portion of the haptic user inputs are received in relation to haptic actions performed over the PIZ 22.

The display layout arbitrator 125 is operable for coordinating a usage of the CIZ 21 and a usage of the at least second zone 22. In an example embodiment, the display layout arbitrator 125 is further operable for adjusting the layout with which the critical and other information, and the prompts related to haptic inputs are presented over the available area of the viewing surface 49 in response to the evaluation of the stored haptic input history. Additionally or alternatively, the display layout arbitrator 125 may be operable for adjusting the layout with which the critical and other information, and the prompts related to haptic inputs are presented over the available area of the viewing surface 49 in response to signaling from the camera 41 and/or the ambience monitor 42 (FIG. 4).

The presentation of the critical information may be moved within the CIZ 21 to an area 61 of computed likely maximum visibility. The maximum visibility zone 61 may be disposed entirely within the CIZ 21, or a portion of the area 61 may be moved into a partial overlap therewith (or another area of the viewing surface 49).

Responsive to the evaluation of the stored haptic history, the display layout arbitrator is operable for setting, changing, modifying, presenting, and/or adjusting the position of one or more haptic input prompts 62. The haptic input prompts 62 may be positioned or moved within the PTZ 22, or elsewhere over the viewing surface 49. A touch usage history 67, e.g., since a last cleaning or other maintenance action may be presented. The usage history 67 may inform operators in relation to upcoming scheduled, recommended, or other maintenance. The peripheral zone 29 remains available as a space for stabilizing, bracing, and/or resting an operator's hand during use of the touchscreen display 110.

The stored haptic usage history may comprise additional information about touch related characteristics of various haptic inputs. For example, the haptic inputs may comprise one or more touches that comprise a "swipe" action characteristic. Relative to other haptic inputs, such as "point" touches (applied with a fingertip to a single point of the haptic input receiver 116, without a swiping action), swipe inputs may cause smudges more readily and thus with higher probability. Moreover, swipe inputs may also redistribute or spread smudges and other optical marring or soiling from one region of the display viewing area to another.

The haptic use history may also comprise data related to an orientation or direction of haptic inputs, such as touch motions, which may also affect the visibility of light scattered or reflected by the touch surface 59 of the haptic input receiver 116. For example, a vertical swipe motion on the display may increase the reflectance or scattering cross section in the horizontal reflectance plane more than a vertical plane, and vice versa.

The haptic use history display 67 and/or the haptic history database may be reset or updated upon maintenance events, such as the most recent time at which the touchscreen display 110 was cleaned. The system 100 may use data stored in relation to the haptic use history in various ways. For example, alerts and other critical information may be positioned selectively by the display layout arbitrator 125 in regions of the viewing area of the display 110 that have lower numbers and/or likely severity of smudges, based on the history since the last cleaning.

Prompts may comprise "buttons" presented on the display and operable for receiving one or more haptic input touches and gestures. The display layout arbitrator may position the input prompts in locations disposed over the viewing area 49 to receive the touches and gestures, spread the usage more evenly over a designated section of the haptically active surface 59, or alternately over the full viewing area of the touchscreen display 110 conforming to the viewing surface 49. The buttons and other prompts may be moved, shifted, and/or repositioned by the display layout arbitrator 125 over a small distance.

For example, prompts may be moved upon each redisplay thereof, which can fill in gaps between heavy touch regions and thus lighten the heavy smudges or fingerprints. The touch prompts may also be moved over translational distances greater than the width of the prompt, and to other less touched sections of the haptic input surface 59. Spreading smudges, smears and other touch-related contamination over the full area may delay onset of reduced visibility due to reflectance increases that may be associated therewith.

Prompt locations may also be modified to cluster the touches and haptic inputs in designated sections of the display, such as the PTZ 22, which provides an actively delegated zoned usage. Touch accuracy error rates, which may be related to smudge-related visual obscuration of the display, may be monitored, and stored as components of the stored haptic use history. Layout and usage of the display screen can be modified by the display layout arbitrator 125 in response to these data.

A reset signal may be presented with the touch usage history 67 to indicate that the touch usage history 67 should be reset, and/or that the haptic history database 62 should be refreshed. The reset may be actively initiated by an operator or other user, such as a technician, maintenance, or cleaning staff individual. The reset may also be initiated upon power up, by default.

Additionally or alternatively, the reset may be initiated in response to the monitoring of the haptic inputs and other touch activity, in which a likelihood of a cleaning or maintenance procedure is detected or recognized. For example, repeated swiping and/or wiping of the viewing surface 49 and/or the haptic input surface 59 without regard to displayed symbology or prompts may indicate likely upcoming cleaning, e.g., especially where said repetitive swiping progresses across the area of the touch surface 59 of the touchscreen display device 110.

Example Process.

Example embodiments may also relate to the performance of process steps related to monitoring ambient conditions and/or other situational/environmental data in which the touchscreen display device 110 may be used or deployed, optical performance of the touchscreen display device 110, and/or the history of haptic inputs received by the haptic input receiver 116.

Example embodiments may thus also relate to the performance of other process steps (e.g., in addition to the steps of the example process 30; described above with reference to FIG. 3). FIG. 7 depicts a flowchart for an example process 70 relating to operating a touchscreen display device, according to an example embodiment of the present invention. The steps of the process 70 may be considered optional (e.g., relative to the step 31 and the step 32 of the process 30).

In step 71, one or more of a plurality of characteristics relating to an operating environment in which the touchscreen display device is used are monitored.

In step 72, an operating characteristic of the touchscreen display device is adjusted. The adjustment relates to a visibility characteristic of the presented information, which is modified based on the monitored one or more characteristics.

The plurality of characteristics relating to an operating environment in which the touchscreen display is used may relate to one or more of a location of the touchscreen display within a host, an orientation of the touchscreen display within the host, a location of the host, an orientation of the host, a current time of day, a current date, a weather condition, and/or an input from a user of the touchscreen display in relation to at least one of the plurality of operating environment characteristics.

In step 73, at least one characteristic relating to a visibility of the information presented on the touchscreen display device is monitored.

In step 74, the monitored at least one characteristic may be compared to a reference target, which is stored in relation thereto.

In step 75, an action may be performed based on the comparison. The action performed may comprise recommending a cleaning of at least a portion of the touchscreen display device viewing surface and/or adjusting an operating characteristic of the touchscreen display device, which is operable for modifying the visibility characteristic of the presented information.

In an example embodiment, the separating of the available viewing surface area of the touchscreen display device (step 31 of process 30; FIG. 3) may comprise allocating a first portion of the available viewing surface area to the first critical information zone 21 and allocating a second portion of the available viewing surface area to the at least second preferred touch zone 22. The allocated second portion 22 may be spatially segregated from the first allocated portion 21, and the second portion 22 may be allocated into a peripheral disposition, relative to the allocated first portion 21.

In step 76, a usage of the at least second zone is monitored in relation to the receiving of the one or more haptic user inputs.

In step 77 usage history of the touchscreen display device is then evaluated, based on the monitoring of the at least second zone 22 in relation to the receiving of the one or more haptic user inputs.

In step 78, the allocation of one or more of the first zone 21 or the at least second zone 22 may be changed, adjusted or modified based on the evaluated usage history.

In another aspect, an example embodiment of the present invention relates to non-transitory computer readable storage media such as memory, optical, magnetic, electronic, or other tangible physical media. In an example embodiment, the non-transitory computer readable media comprises instructions physically stored therewith. The instructions are operable for causing, or controlling a processor device to perform a computer based method for presenting information on a touchscreen display, such as the example method 70 described above.

To supplement the present disclosure, this application incorporates entirely by reference the following commonly assigned patents, patent application publications, and patent applications:

U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,525; U.S. Pat. No. 8,794,526; U.S. Pat. No. 8,798,367; U.S. Pat. No. 8,807,431; U.S. Pat. No. 8,807,432; U.S. Pat. No. 8,820,630; U.S. Pat. No. 8,822,848; U.S. Pat. No. 8,824,692; U.S. Pat. No. 8,824,696; U.S. Pat. No. 8,842,849; U.S. Pat. No. 8,844,822; U.S. Pat. No. 8,844,823; U.S. Pat. No. 8,849,019; U.S. Pat. No. 8,851,383; U.S. Pat. No. 8,854,633; U.S. Pat. No. 8,866,963;

U.S. Pat. No. 8,868,421; U.S. Pat. No. 8,868,519; U.S. Pat. No. 8,868,802; U.S. Pat. No. 8,868,803; U.S. Pat. No. 8,870,074; U.S. Pat. No. 8,879,639; U.S. Pat. No. 8,880,426; U.S. Pat. No. 8,881,983; U.S. Pat. No. 8,881,987; U.S. Pat. No. 8,903,172; U.S. Pat. No. 8,908,995; U.S. Pat. No. 8,910,870; U.S. Pat. No. 8,910,875; U.S. Pat. No. 8,914,290; U.S. Pat. No. 8,914,788; U.S. Pat. No. 8,915,439; U.S. Pat. No. 8,915,444; U.S. Pat. No. 8,916,789; U.S. Pat. No. 8,918,250; U.S. Pat. No. 8,918,564; U.S. Pat. No. 8,925,818; U.S. Pat. No. 8,939,374; U.S. Pat. No. 8,942,480; U.S. Pat. No. 8,944,313; U.S. Pat. No. 8,944,327; U.S. Pat. No. 8,944,332; U.S. Pat. No. 8,950,678; U.S. Pat. No. 8,967,468; U.S. Pat. No. 8,971,346; U.S. Pat. No. 8,976,030; U.S. Pat. No. 8,976,368; U.S. Pat. No. 8,978,981; U.S. Pat. No. 8,978,983; U.S. Pat. No. 8,978,984; U.S. Pat. No. 8,985,456; U.S. Pat. No. 8,985,457; U.S. Pat. No. 8,985,459; U.S. Pat. No. 8,985,461; U.S. Pat. No. 8,988,578; U.S. Pat. No. 8,988,590; U.S. Pat. No. 8,991,704; U.S. Pat. No. 8,996,194; U.S. Pat. No. 8,996,384; U.S. Pat. No. 9,002,641; U.S. Pat. No. 9,007,368; U.S. Pat. No. 9,010,641; U.S. Pat. No. 9,015,513; U.S. Pat. No. 9,016,576; U.S. Pat. No. 9,022,288; U.S. Pat. No. 9,030,964; U.S. Pat. No. 9,033,240; U.S. Pat. No. 9,033,242; U.S. Pat. No. 9,036,054; U.S. Pat. No. 9,037,344; U.S. Pat. No. 9,038,911; U.S. Pat. No. 9,038,915; U.S. Pat. No. 9,047,098; U.S. Pat. No. 9,047,359; U.S. Pat. No. 9,047,420; U.S. Pat. No. 9,047,525; U.S. Pat. No. 9,047,531; U.S. Pat. No. 9,053,055; U.S. Pat. No. 9,053,378; U.S. Pat. No. 9,053,380; U.S. Pat. No. 9,058,526; U.S. Pat. No. 9,064,165; U.S. Pat. No. 9,064,167; U.S. Pat. No. 9,064,168; U.S. Pat. No. 9,064,254; U.S. Pat. No. 9,066,032; U.S. Pat. No. 9,070,032; U.S. Design Pat. No. D716,285; U.S. Design Pat. No. D723,560; U.S. Design Pat. No. D730,357; U.S. Design Pat. No. D730,901; U.S. Design Pat. No. D730,902 U.S. Design Pat. No. D733,112; U.S. Design Pat. No. D734,339; International Publication No. 2013/163789; International Publication No. 2013/173985; International Publication No. 2014/019130; International Publication No. 2014/110495; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0287258; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0313325; U.S. Patent Application Publication No. 2013/0342717; U.S. Patent Application Publication No. 2014/0001267; U.S. Patent Application Publication No. 2014/0008439; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0042814; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0078341; U.S. Patent Application Publication No. 2014/0078345; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0104451; U.S. Patent Application Publication No. 2014/0106594; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0114530; U.S. Patent Application Publication No. 2014/0124577; U.S. Patent Application Publication No. 2014/0124579; U.S. Patent Application Publication No. 2014/0125842; U.S. Patent Application Publication No. 2014/0125853; U.S. Patent Application Publication No. 2014/0125999; U.S. Patent Application Publication No. 2014/0129378; U.S. Patent Application Publication No. 2014/0131438; U.S. Patent Application Publication No. 2014/0131441; U.S. Patent Application Publication No. 2014/0131443; U.S. Patent Application Publication No. 2014/0131444; U.S. Patent Application Publication No. 2014/0131445; U.S. Patent Application Publication No. 2014/0131448; U.S. Patent Application Publication No. 2014/0133379; U.S. Patent Application Publication No. 2014/0136208; U.S. Patent Application Publication No. 2014/0140585; U.S. Patent Application Publication No. 2014/0151453; U.S. Patent Application Publication No. 2014/0152882; U.S. Patent Application Publication No. 2014/0158770; U.S. Patent Application Publication No. 2014/0159869; U.S. Patent Application Publication No. 2014/0166755; U.S. Patent Application Publication No. 2014/0166759; U.S. Patent Application Publication No. 2014/0168787; U.S. Patent Application Publication No. 2014/0175165; U.S. Patent Application Publication No. 2014/0175172; U.S. Patent Application Publication No. 2014/0191644; U.S. Patent Application Publication No. 2014/0191913; U.S. Patent Application Publication No. 2014/0197238; U.S. Patent Application Publication No. 2014/0197239; U.S. Patent Application Publication No. 2014/0197304; U.S. Patent Application
Publication No. 2014/0214631; U.S. Patent Application
Publication No. 2014/0217166; U.S. Patent Application
Publication No. 2014/0217180; U.S. Patent Application
Publication No. 2014/0231500; U.S. Patent Application
Publication No. 2014/0232930; U.S. Patent Application
Publication No. 2014/0247315; U.S. Patent Application
Publication No. 2014/0263493; U.S. Patent Application
Publication No. 2014/0263645; U.S. Patent Application
Publication No. 2014/0267609; U.S. Patent Application
Publication No. 2014/0270196; U.S. Patent Application
Publication No. 2014/0270229; U.S. Patent Application
Publication No. 2014/0278387; U.S. Patent Application
Publication No. 2014/0278391; U.S. Patent Application
Publication No. 2014/0282210; U.S. Patent Application
Publication No. 2014/0284384; U.S. Patent Application
Publication No. 2014/0288933; U.S. Patent Application
Publication No. 2014/0297058; U.S. Patent Application
Publication No. 2014/0299665; U.S. Patent Application
Publication No. 2014/0312121; U.S. Patent Application
Publication No. 2014/0319220; U.S. Patent Application
Publication No. 2014/0319221; U.S. Patent Application
Publication No. 2014/0326787; U.S. Patent Application
Publication No. 2014/0332590; U.S. Patent Application
Publication No. 2014/0344943; U.S. Patent Application
Publication No. 2014/0346233; U.S. Patent Application
Publication No. 2014/0351317; U.S. Patent Application
Publication No. 2014/0353373; U.S. Patent Application
Publication No. 2014/0361073; U.S. Patent Application
Publication No. 2014/0361082; U.S. Patent Application
Publication No. 2014/0362184; U.S. Patent Application
Publication No. 2014/0363015; U.S. Patent Application
Publication No. 2014/0369511; U.S. Patent Application
Publication No. 2014/0374483; U.S. Patent Application
Publication No. 2014/0374485; U.S. Patent Application
Publication No. 2015/0001301; U.S. Patent Application
Publication No. 2015/0001304; U.S. Patent Application
Publication No. 2015/0003673; U.S. Patent Application
Publication No. 2015/0009338; U.S. Patent Application
Publication No. 2015/0009610; U.S. Patent Application
Publication No. 2015/0014416; U.S. Patent Application
Publication No. 2015/0021397; U.S. Patent Application
Publication No. 2015/0028102; U.S. Patent Application
Publication No. 2015/0028103; U.S. Patent Application
Publication No. 2015/0028104; U.S. Patent Application
Publication No. 2015/0029002; U.S. Patent Application
Publication No. 2015/0032709; U.S. Patent Application
Publication No. 2015/0039309; U.S. Patent Application
Publication No. 2015/0039878; U.S. Patent Application
Publication No. 2015/0040378; U.S. Patent Application
Publication No. 2015/0048168; U.S. Patent Application
Publication No. 2015/0049347; U.S. Patent Application
Publication No. 2015/0051992; U.S. Patent Application
Publication No. 2015/0053766; U.S. Patent Application
Publication No. 2015/0053768; U.S. Patent Application
Publication No. 2015/0053769; U.S. Patent Application
Publication No. 2015/0060544; U.S. Patent Application
Publication No. 2015/0062366; U.S. Patent Application
Publication No. 2015/0063215; U.S. Patent Application
Publication No. 2015/0063676; U.S. Patent Application
Publication No. 2015/0069130; U.S. Patent Application
Publication No. 2015/0071819; U.S. Patent Application
Publication No. 2015/0083800; U.S. Patent Application
Publication No. 2015/0086114; U.S. Patent Application
Publication No. 2015/0088522; U.S. Patent Application
Publication No. 2015/0096872; U.S. Patent Application
Publication No. 2015/0099557; U.S. Patent Application
Publication No. 2015/0100196; U.S. Patent Application
Publication No. 2015/0102109; U.S. Patent Application
Publication No. 2015/0115035; U.S. Patent Application
Publication No. 2015/0127791; U.S. Patent Application
Publication No. 2015/0128116; U.S. Patent Application
Publication No. 2015/0129659; U.S. Patent Application
Publication No. 2015/0133047; U.S. Patent Application
Publication No. 2015/0134470; U.S. Patent Application
Publication No. 2015/0136851; U.S. Patent Application
Publication No. 2015/0136854; U.S. Patent Application
Publication No. 2015/0142492; U.S. Patent Application
Publication No. 2015/0144692; U.S. Patent Application
Publication No. 2015/0144698; U.S. Patent Application
Publication No. 2015/0144701; U.S. Patent Application
Publication No. 2015/0149946; U.S. Patent Application
Publication No. 2015/0161429; U.S. Patent Application
Publication No. 2015/0169925; U.S. Patent Application
Publication No. 2015/0169929; U.S. Patent Application
Publication No. 2015/0178523; U.S. Patent Application
Publication No. 2015/0178534; U.S. Patent Application
Publication No. 2015/0178535; U.S. Patent Application
Publication No. 2015/0178536; U.S. Patent Application
Publication No. 2015/0178537; U.S. Patent Application
Publication No. 2015/0181093; U.S. Patent Application
Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILEPHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.); U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten); U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

Example embodiments of the present invention thus relate to the presentation of critical information on an interactive display, which is also operable for receiving user inputs effectively and under various ambient lighting conditions, including high levels of ambient illumination (brightness). Example embodiments present the critical information effectively with high levels of ambient illumination on an interactive display without changing the position thereof over a translational axis or a rotational axis, and without shading a viewing surface thereof from a bright lighting source. Example embodiments preserve and sustain the optical performance of interactive displays, and the viewability of critical information presented on the viewing surface thereof, and independent of cleaning and wiping or other maintenance actions performed over the viewing surface.

Example embodiments of the present invention have thus been described. An example embodiment of the present invention relates to a method for presenting information on a touchscreen display device comprising process steps, which may be summarized as follows. An available viewing surface area of the touchscreen display device is separated into a first zone and at least a second area. The first area is operable for presenting a critical portion of the information. The at least second area is operable for receiving one or more haptic user inputs. A usage of the first zone and a usage of the at least second zone are coordinated. The presentation of the critical information in the first separated zone, and/or a prompt related to at least one of the one or more haptic user inputs may be controlled based on the coordinated usage.

For clarity and brevity, as well as to avoid unnecessary or unhelpful obfuscating, obscuring, obstructing, or occluding features of an example embodiment, certain intricacies and details, which are known generally to artisans of ordinary skill in related technologies, may have been omitted or discussed in less than exhaustive detail. Any such omissions or discussions are unnecessary for describing example embodiments of the invention, and not particularly relevant to understanding of significant features, functions and aspects of the example embodiments described herein.

In the specification and/or figures, typical embodiments of the invention have been disclosed. The present invention is not limited to such example embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed, is:

1. A method for presenting information on a touchscreen display device, the method comprising the steps of:
separating an available viewing surface area of the touchscreen display device into a first zone, the first zone operable for presenting a critical portion of the information, and at least a second zone operable for receiving one or more haptic user inputs; and
coordinating a usage of the first zone and the at least second zone based at least in part on an input corresponding to one or more of a plurality of operating environment characteristics that relate to a lighting condition proximate to the touchscreen display device.

2. The method as described in claim 1 wherein, based on the coordinated usage, the presentation of the critical information in the first separated zone is controlled.

3. The method as described in claim 1 wherein, based on the coordinated usage, at least one of the one or more haptic user inputs is prompted.

4. The method as described in claim 1, further comprising:
monitoring one or more of a plurality of characteristics relating to an operating environment in which the touchscreen display device is used; and
adjusting an operating characteristic of the touchscreen display device wherein, based on the monitored one or more characteristics, a visibility characteristic of the presented information is modified.

5. The method as described in claim 4 wherein the plurality of characteristics relating to an operating environment in which the touchscreen display is used relates to one or more of a location of the touchscreen display within a host, an orientation of the touchscreen display within the host, a location of the host, an orientation of the host, a current time of day, a current date, a weather condition, or an input from a user of the touchscreen display in relation to at least one of the plurality of operating environment characteristics.

6. The method as described in claim 1, further comprising:
monitoring at least one characteristic relating to a visibility of the information presented on the touchscreen display device;
comparing the monitored at least one characteristic to a reference target, which is stored in relation thereto; and
performing an action based on the comparison.

7. The method as described in claim 6, wherein the action performed comprises one or more of:
recommending a cleaning of at least a portion of the touchscreen display device viewing surface; or
adjusting an operating characteristic of the touchscreen display device wherein the visibility characteristic of the presented information is modified.

8. The method as described in claim 1, wherein the separating step comprises:

allocating a first portion of the available viewing surface area to the first zone; and allocating a second portion of the available viewing surface area to the at least second zone, wherein the allocated second portion is spatially segregated, at least partially, from the first allocated portion.

9. The method as described in claim 8, wherein the allocated second portion is disposed peripherally in relation to the allocated first portion.

10. The method as described in claim 8, further comprising:

monitoring the at least second zone in relation to the receiving of the one or more haptic user inputs;

evaluating a usage history of the touchscreen display device based on the monitoring of the at least second zone in relation to the receiving of the one or more haptic user inputs; and changing the allocation of one or more of the first zone or the at least second zone based on the evaluated usage history.

11. A system operable for presenting information, the system comprising:

a display component comprising a viewing surface and operable for rendering the presented information visually over an available area of the viewing surface;

a touchscreen component comprising a transparent material, disposed over at least a portion of the available viewing surface area of the display component, and operable for receiving one or more haptic user inputs; and a controller component operable for separating the available viewing surface area of the display component into a first zone over which the information is presented, and at least a second zone conforming to at least a portion of the touchscreen component and over which at least a portion of the haptic user inputs are received, the controller further operable for coordinating a usage of the first zone and a usage of the at least second zone based at least in part on an input corresponding to one or more of a plurality of operating environment characteristics that relate to a lighting condition proximate to the display component.

12. The system as described in claim 11 wherein, based on the coordinated usage, the presentation of the critical information in the first separated zone is controlled.

13. The system as described in claim 11 wherein, based on the coordinated usage, at least one of the one or more haptic user inputs is prompted.

14. The system as described in claim 11 wherein the controller component is further operable for:

monitoring one or more of a plurality of characteristics relating to an operating environment in which the touchscreen display device is used; and adjusting an operating characteristic of the touchscreen display device wherein, based on the monitored one or more characteristics, a visibility characteristic of the presented information is modified.

15. The system as described in claim 11 wherein the controller component is further operable for:

monitoring at least one characteristic relating to a visibility of the information presented on the touchscreen display device;

comparing the monitored at least one characteristic to a reference target, which is stored in relation thereto; and performing an action based on the comparison.

16. The system as described in claim 15, wherein the action performed comprises one or more of:

recommending a cleaning of at least a portion of the touchscreen display device viewing surface; or adjusting an operating characteristic of the touchscreen display device wherein the visibility characteristic of the presented information is modified.

17. The system as described in claim 11, wherein the separating the available viewing surface area of the display component into a first zone and at least a second zone comprises:

allocating a first portion of the available viewing surface area to the first zone; and allocating a second portion of the available viewing surface area to the at least second zone, wherein the allocated second portion is spatially segregated from the first allocated portion.

18. The system as described in claim 17, wherein the allocated second portion is disposed peripherally in relation to the allocated first portion.

19. The system as described in claim 18 wherein the controller component is further operable for:

monitoring the at least second zone in relation to the receiving of the one or more haptic user inputs;

evaluating a usage history of the touchscreen display device based on the monitoring of the at least second zone in relation to the receiving of the one or more haptic user inputs; and changing the allocation of one or more of the first zone or the at least second zone based on the evaluated usage history.

20. A non-transitory computer readable medium comprising instructions, which upon execution by a processor device are operable for causing or controlling a computer based process for presenting information on a touchscreen display, the process comprising the steps of:

separating an available viewing surface area of the touchscreen display device into a first zone, the first zone operable for presenting a critical portion of the information, and at least a second zone operable for receiving one or more haptic user inputs; and coordinating a usage of the first zone and a usage of the at least second zone based at least in part on an input corresponding to one or more of a plurality of operating environment characteristics that relate to a lighting condition proximate to the touchscreen display device.

* * * * *